(12) United States Patent
Lee

(10) Patent No.: US 6,850,304 B2
(45) Date of Patent: Feb. 1, 2005

(54) IN-PLANE SWITCHING MODE LIQUID CRYSTAL DISPLAY WITH A COMPENSATION ELECTRODE STRUCTURE AND METHOD OF FORMING THE SAME

(75) Inventor: Deuk Su Lee, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 10/849,840

(22) Filed: May 21, 2004

(65) Prior Publication Data

US 2004/0212770 A1 Oct. 28, 2004

Related U.S. Application Data

(63) Continuation of application No. 10/245,336, filed on Sep. 18, 2002, now Pat. No. 6,765,642.

(51) Int. Cl.[7] .............................................. G02F 1/1343
(52) U.S. Cl. ........................................................ 349/141
(58) Field of Search .................................. 349/141, 139

(56) References Cited

U.S. PATENT DOCUMENTS 6,628,360 B2     9/2003   Yamada et al. ............. 349/132
6,724,454 B2 *   4/2004   Kim et al. .................. 349/141

* cited by examiner

*Primary Examiner*—Tarifur R. Chowdhury
*Assistant Examiner*—Jeanne Andrea Di Grazio
(74) *Attorney, Agent, or Firm*—Rabin & Berdo, P.C.

(57) ABSTRACT

An IPS-LCD having a compensation electrode structure. In each pixel area, at least two common electrodes extending in a first Y-direction and at least one pixel electrode extending in a second Y-direction are inter-digitated with each other. Also, at least two compensation electrodes extending in the Y-direction are patterned on the same plane with the pixel electrode, and overlap the two common electrodes, respectively. A first interval between the first compensation electrode and the pixel electrode is equal to a second interval between the pixel electrode and the second compensation electrode.

16 Claims, 16 Drawing Sheets

IN-PLANE SWITCHING MODE LIQUID CRYSTAL DISPLAY WITH A COMPENSATION ELECTRODE STRUCTURE AND METHOD OF FORMING THE SAME

This is a continuation of 10/245,336 filed Sep. 18, 2002, now U.S. Pat. No. 6,765,642.

BACKGROUND OF THE INVENTION

1. Field of the Invention

The present invention relates in general to an in-plane switching liquid crystal display (IPS-LCD). In particular, the present invention relates to an IPS-LCD with a compensation electrode structure and a method of forming the same.

2. Description of the Related Art

Liquid crystal displays (LCDs) may be classified by the orientation of the liquid crystal molecules between the spaced apart glass substrates. In a conventional twisted nematic LCD (TN-LCD), the liquid crystal molecules are twisted between the two substrates. In contrast, in an in-plane switching LCD (IPS-LCD), common electrodes and pixel electrodes are formed on a lower glass substrate (TFT substrate) and an in-plane electric field therebetween is generated to rearrange the liquid crystal molecules along the electric field. Accordingly, the IPS-LCD has been used or suggested for improving drawbacks of the conventional TN-LCD, such as a-very narrow viewing angle and a low contrast ratio.

In order to achieve a better result of the in-plane electric field, a comb-shaped electrode array is built in the IPS-LCD to solve the problems such as an insufficient aperture ratio and crosstalk produced between data lines and common electrodes. FIGS. 1A and 1B are sectional diagrams of a conventional IPS-LCD, and FIG. 1C is a top view showing an electrode array within a pixel area of an IPS-LCD according to the prior art. FIG. 1A shows the alignment of the liquid crystal molecules at an off state, and FIG. 1B shows the alignment of the liquid crystal molecules at an on state. The IPS-LCD has a lower glass substrate 10, an upper glass substrate 12, and a liquid crystal layer 14 disposed in a space between the two parallel glass substrates 10 and 12. On the lower glass substrate 10, serving as a TFT substrate, a plurality of strip-shaped common electrodes 16 arranged as a comb-shape structure is patterned on the lower glass substrate 10, an insulating layer 18 is deposited on the common electrodes 16 and the lower glass substrate 10, and a plurality of strip-shaped pixel electrodes 20 arranged as a comb-shape structure is patterned on the insulating layer 18.

As shown in FIG. 1A, before an external voltage is applied to the IPS-LCD, the liquid crystal molecules 14A are aligned in a direction parallel to the lower glass substrate 10. As shown in FIG. 1B, when an external voltage is applied to the IPS-LCD, an in-plain electric field is generated between the common electrode 16 and the pixel electrode 20, resulting in a rotation of the liquid crystal molecules 14B toward the in-plane electric field.

Depending on the material and the structure design of the common electrode 16 and the pixel electrode 20, the conventional comb-shaped electrode array is classified as three types. FIGS. 2A to 2C are sectional diagrams showing three types of the common electrode 16 and the pixel electrode 20 in the conventional comb-shaped electrode array. In the first type, as shown in FIG. 2A, the common electrode 16 and the pixel electrode 20 are patterned on the same plane and made of a transparent conductive material, such as ITO or IZO. In the second type, as shown in FIG. 2B, the common electrode 16 made of a non-transparent conductive material, such as Al and MoW, is patterned on the lower glass substrate 10 followed by depositing the insulating layer 18, and then the pixel electrode 20 made of a transparent conductive material, such as ITO or IZO, is patterned on the insulating layer 18. In the third type, as shown in FIG. 2C, the common electrode 16 and the pixel electrode 20 are patterned on the same plane and made of a non-transparent conductive material, such as Al and MoW. By comparison, the first type shown in FIG. 2A can provide an greater luminance to the IPS-LCD than the second type shown in FIG. 2B and the third type shown in FIG. 2C, but provides a worsen view-angle characteristic than the second type and the third type. Also, the third type severely decreases the luminance of the IPS-LCD because most of the light is blocked by the non-transparent conductive material. Therefore, the second type shown in FIG. 2B is the most common type used in the conventional comb-shaped electrode array.

However, as to the second type, since the common electrode 16 and the pixel electrode 20 are patterned on different planes, it is possible to form different intervals between the common electrodes 16 and the pixel electrodes 20 on the electrode array caused by misalignment in the photolithography process. FIG. 3A is a sectional diagram showing an ideal case when a constant interval is formed between the common electrode 16 and the pixel electrode 20. FIG. 3B is a transmittance-position diagram according to the electrode array shown in FIG. 3A. FIG. 4A is a sectional diagram showing a practical case when different intervals are formed between the common electrodes 16 and the pixel electrodes 20. FIG. 4B is a transmittance-position diagram according to the electrode array shown in FIG. 4A. As shown in FIGS. 3A and 3B, the interval between the common electrode 16 and the pixel electrode 20 is a constant S1, and each S1 spacing region has the same degree of in-plane electric field, resulting in the same capacitance and transmittance. In contrast, as shown in FIGS. 4A and 4B, the intervals between the common electrode 16 and the pixel electrode 20 are different, such as S1 and S2, and the S1 spacing region and the S2 spacing region have different degrees of in-plane electric field, resulting in different capacitances and transmittances. In this practical case, demerits such as trip mura, shot mura and flicker are commonly found in the conventional IPS-LCD.

SUMMARY OF THE INVENTION

An object of the present invention is to provide an IPS-LCD with a compensation electrode structure to form an alignment free electrode array to solve the demerits found in the prior art.

An IPS-LCD with a compensation electrode structure comprises a first glass substrate and a second glass substrate arranging in parallel to each other, and liquid crystal layer formed in a space between first glass substrate and the second glass substrate. A plurality of gate lines extending in a first direction is formed on the first glass substrate, and a plurality of data lines extending in a second direction are formed on the first glass substrate, wherein the second direction is perpendicular to the first direction. Thus, the data lines and gate lines constitute an array of pixel areas arranging in a matrix form. A TFT is formed in each pixel area.

A comb-shaped common electrode structure, a comb-shaped pixel electrode structure and a compensation electrode structure are disposed in each pixel area on the first glass substrate. The comb-shaped common electrode structure comprises a common line parallel to the gate line and at least two common electrodes extending in the second direction. The comb-shaped pixel electrode structure comprises a bar near the gate line and at least one pixel electrode which extends in the second direction and is inter-digitated with the two common electrodes. The compensation electrode structure comprises at least a first compensation electrode and a second compensation electrode that extend in the second direction and are patterned on the same plane with the pixel electrode. The two compensation electrodes overlap the two common electrodes respectively, and a first interval between the first compensation electrode and the pixel electrode is equal to a second interval between the pixel electrode and the second compensation electrode.

It is an advantage of the present invention that the same degree of in-plane electric field is formed within the first interval and the second interval to provide the same capacitance and transmittance. This eliminates trip mura, shot mura and flicker found in the conventional IPS-LCD.

This and other objective of the present invention will no doubt become obvious to those of ordinary skill in the art after having read the following detailed description of the preferred embodiments which are illustrated in the various figures and drawings.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

First Embodiment

Figures 1A, 1B:
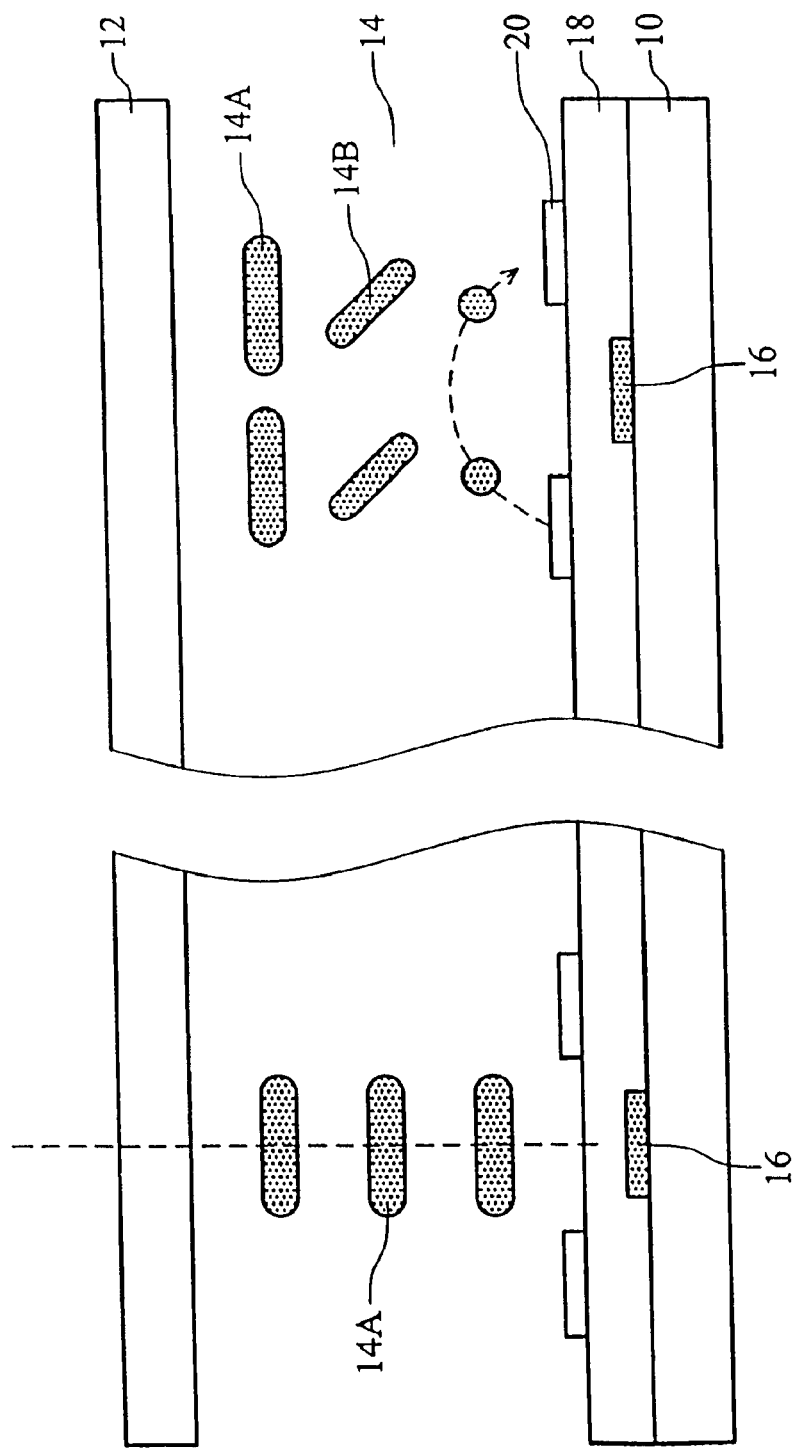
FIG. 1A is a sectional diagram showing the alignment of the liquid crystal molecules at an off state according to the conventional IPS-LCD.
FIG. 1B is a sectional diagram showing the alignment of the liquid crystal molecules at an on state according to the conventional IPS-LCD.
Figure 1C:
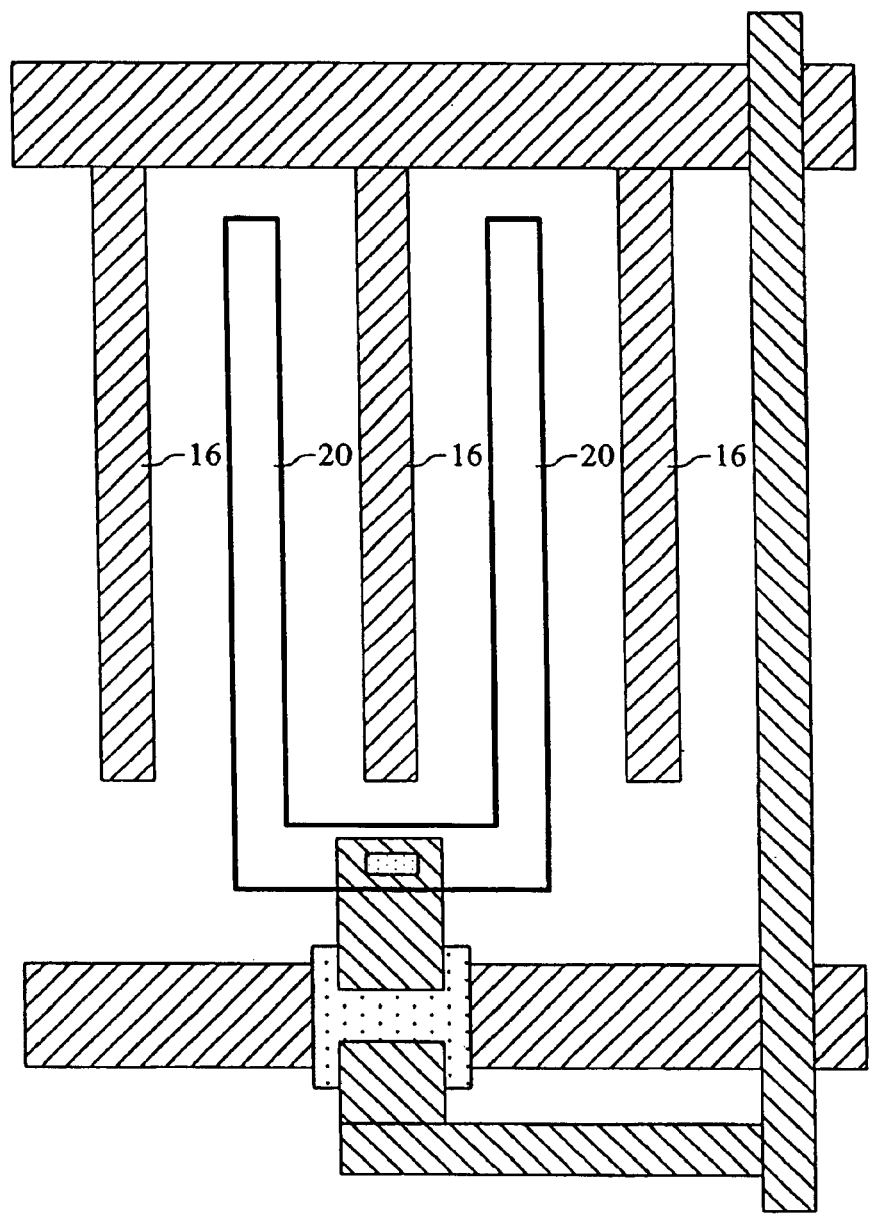
FIG. 1C is a top view showing an electrode array within a pixel area of an IPS-LCD according to the prior art.
Figure 2A:
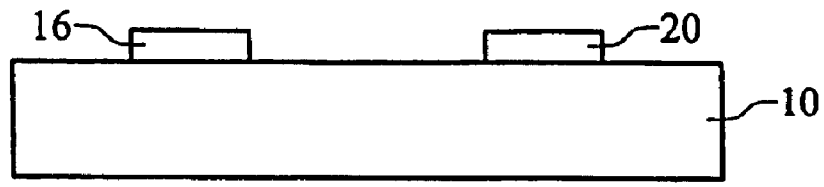
FIG. 2A is a sectional diagram showing the first type of the common electrode and the pixel electrode in the conventional comb-shaped electrode array.
Figure 2B:
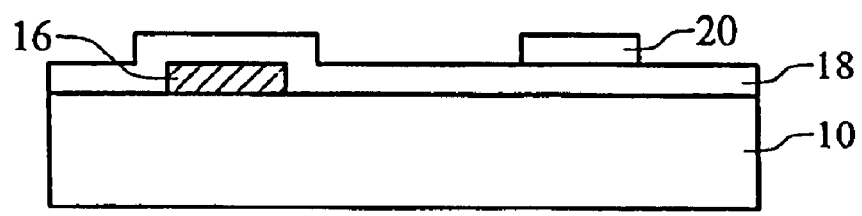
FIG. 2B is a sectional diagram showing the second type of the common electrode and the pixel electrode in the conventional comb-shaped electrode array.
Figure 2C:
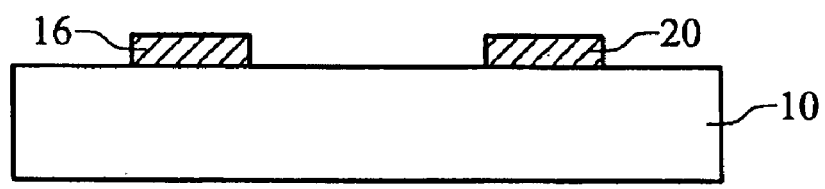
FIG. 2C is a sectional diagram showing the third type of the common electrode and the pixel electrode in the conventional comb-shaped electrode array.
Figure 3A:
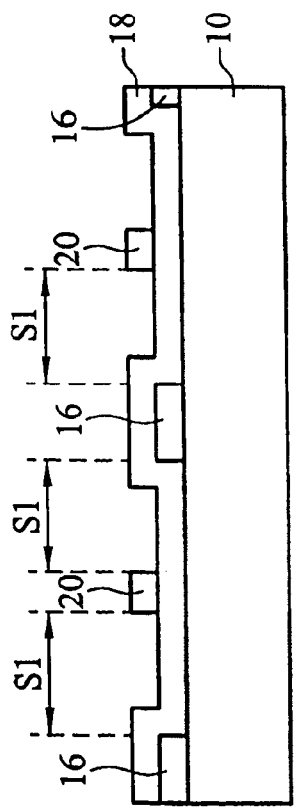
FIG. 3A is a sectional diagram showing an ideal case when a constant interval is formed between the common electrode and the pixel electrode.
Figure 3B:
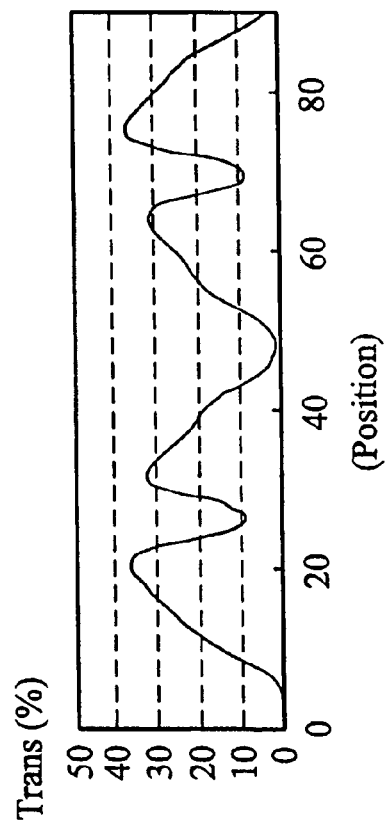
FIG. 3B is a transmittance-position diagram according to the electrode array shown in FIG. 3A.
Figure 4A:
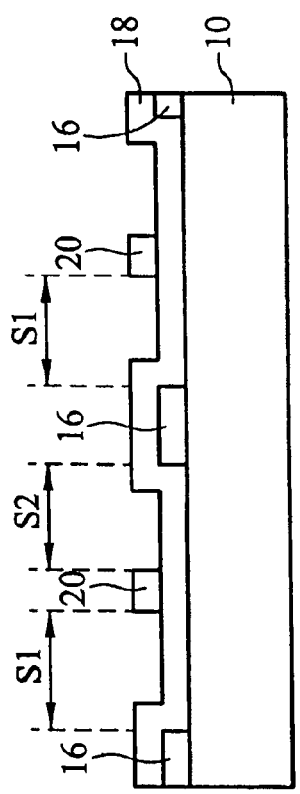
FIG. 4A is a sectional diagram showing a practical case when different intervals are formed between the common electrodes and the pixel electrodes.
Figure 4B:
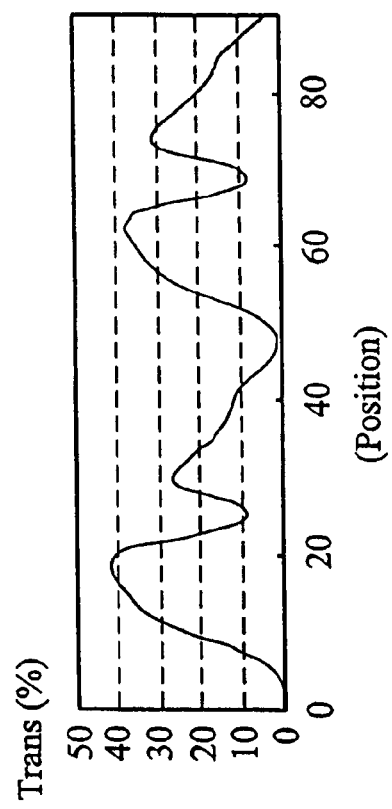
FIG. 4B is a transmittance-position diagram according to the electrode array shown in FIG. 4A.
Figure 5A:
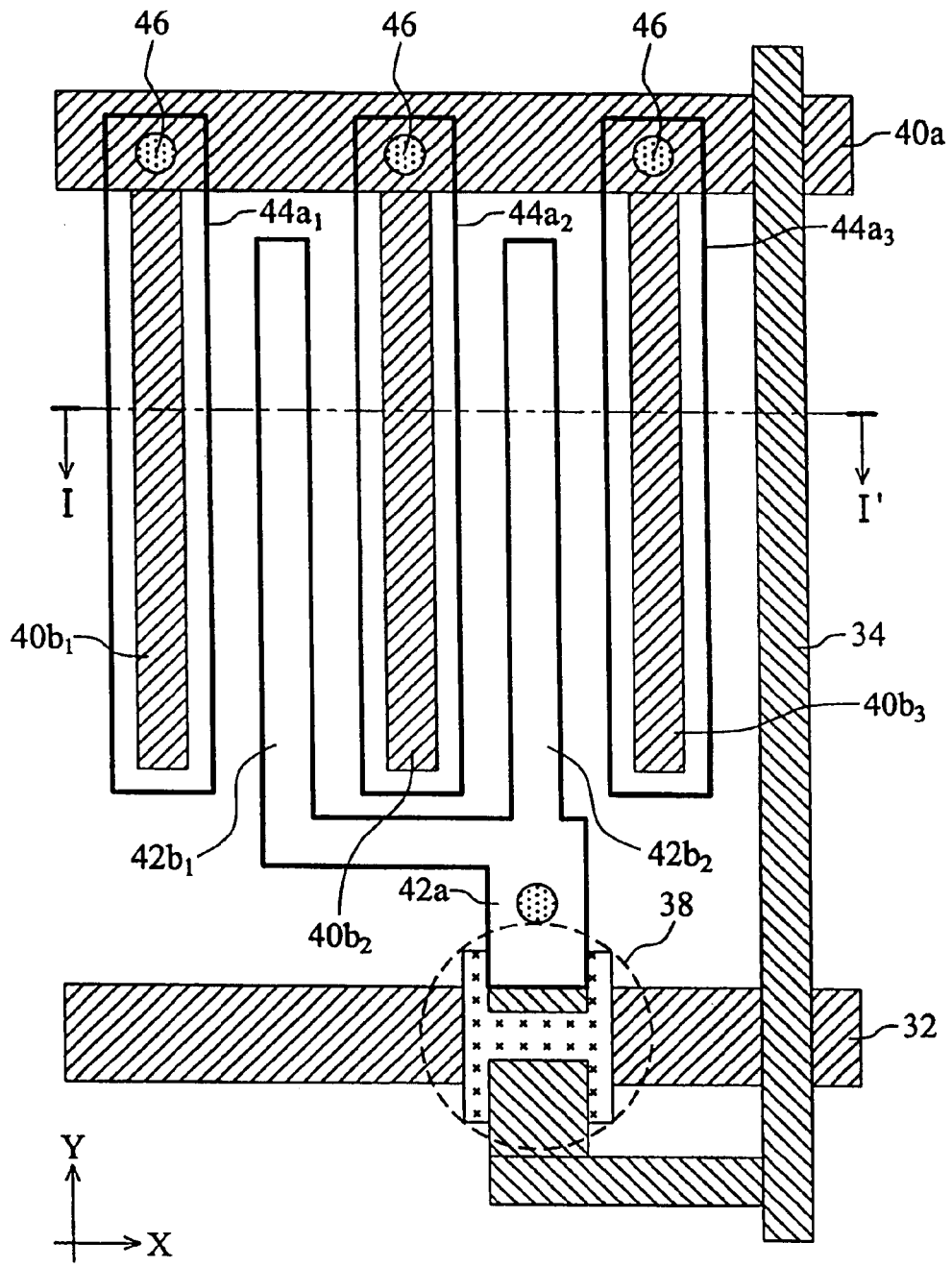
FIG. 5A is a top view showing an electrode array within a pixel area of an IPS-LCD according to the first embodiment of the present invention.
Figure 5B:
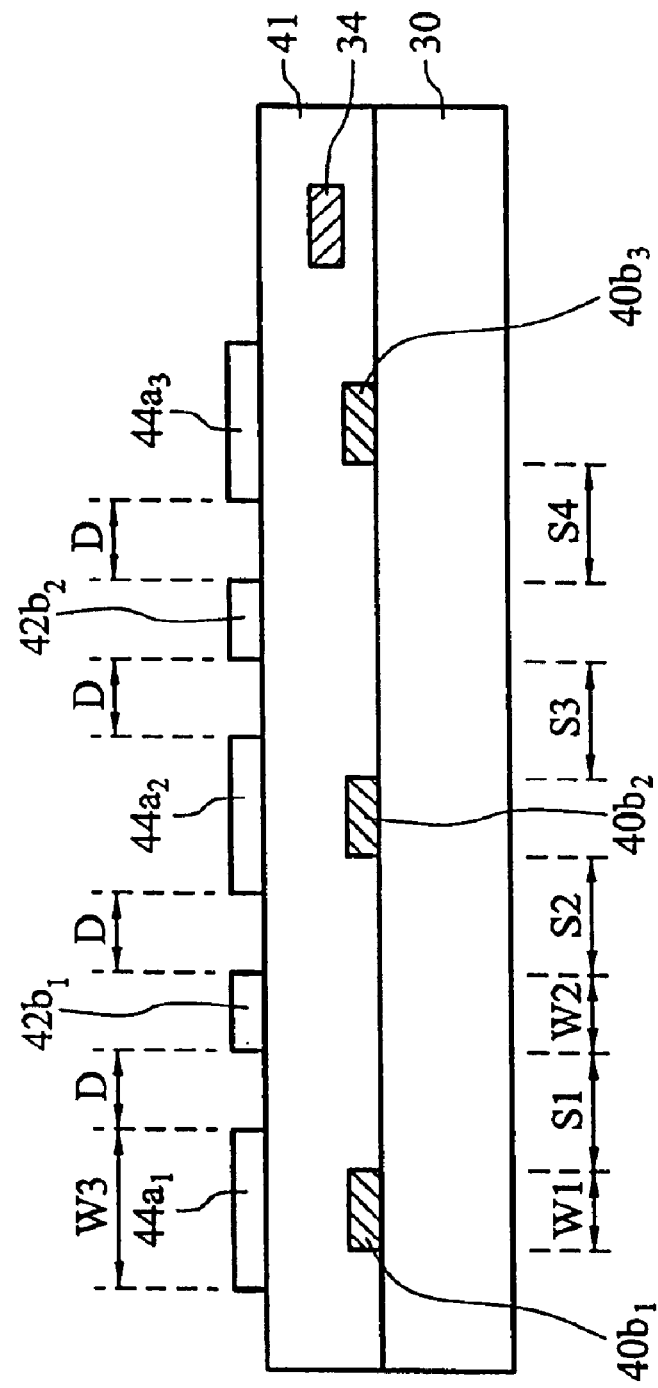
FIG. 5B is a sectional diagram along line I–I' shown in FIG. 5A.
Figure 5C:
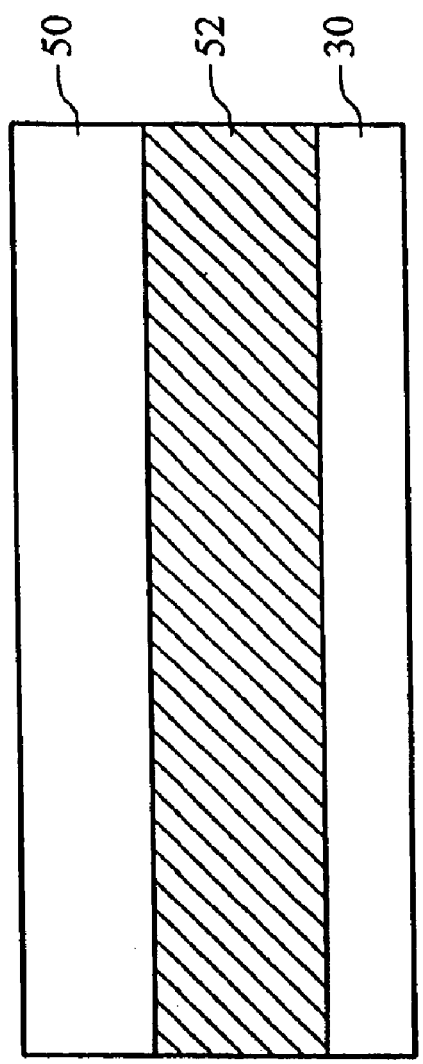
FIG. 5C is a sectional diagram showing an IPS-LCD according to the invention.

FIG. 5A is a top view showing an electrode array within a pixel area of an IPS-LCD according to the first embodiment of the present invention. FIG. 5B is a sectional diagram along line I–I' shown in FIG. 5A. FIG. 5C is a sectional diagram showing an IPS-LCD according to the invention.

As shown in FIG. 5C, an IPS-LCD comprises a pair of glass substrates 30 and 50 arranging in parallel and a liquid crystal layer 52 formed in a space between the two substrates 30 and 50.

As shown in FIGS. 5A and 5B, on the bottom substrate 30 (called a TFT substrate), a plurality of gate lines 32 extending along X-axis and a plurality of data lines 34 extending along Y-axis forms pixel areas 36 arranged in a matrix form. Each of the pixel areas 36 comprises a TFT 38, a comb-shaped common electrode structure 40, a comb-shaped pixel electrode structure 42, and a compensation electrode structure 44. In this case, the TFT 38 is formed near the intersection of the gate line 32 and the data line 34. The comb-shaped common electrode structure 40 comprises a common line 40a disposed in X-axis and a plurality of comb-teeth extending away from the common line 40a along a first direction of Y-axis. Preferably, as shown in FIG. 5A, there are three comb-teeth $40b_1$, $40b_2$, $40b_3$ extending away from the common line 40a along a first direction of Y-axis. The comb-shape pixel electrode structure 42 comprises a bar 42a disposed near the TFT 38 and at least one comb-tooth extending away from the bar 42a along a second direction of Y-axis. Preferably, as shown in FIG. 5B, there are two comb-teeth $42b_1$, $42b_2$ extending away from the bar 42a along a second direction of Y-axis. The two pixel electrodes $42b_1$, $42b_2$ are inter-digitated with the three common electrodes $40b_1$, $40b_2$, $40b_3$, and therefore the pixel area 36 is divided into four spacing regions. In corresponding to the three comb-teeth $40b_1$, $40b_2$, $40b_3$ of the common electrode structure 40, the compensation electrode structure 44 has three compensation electrodes $44a_1$, $44a_1$, $44a_3$ that extend along Y-axis and are patterned on the same plane with the pixel electrodes 42b. Also, the three compensation electrodes $44a_1$, $44a_1$, $44a_3$ overlap the three common electrodes $40b_1$, $40b_2$, $40b_3$, respectively.

As shown in FIG. 5B, the width W1 of the common electrode 40b is less than the width W3 of the compensation electrodes 44a. Preferably, the width W1 and the width W3 satisfy the formula: W3−W1≧1 μm. Moreover, the first interval between the compensation electrode $44a_1$ and the pixel electrode $42b_1$, the second interval between the pixel electrode $42b_1$ and the compensation electrode $44a_2$, the third interval between the compensation electrode $44a_2$ and the pixel electrode $42b_2$, and the fourth interval between the pixel electrode $42b_2$ and the compensation electrode $44a_3$, are fixed at a constant distance D. Furthermore, each of the compensation electrodes $44a_1$, $44a_1$, $44a_3$ is electrically connected to common line 40a via a through hole 46. In addition, the profile of the compensation electrode structure 44 is a design choice. Preferably, the compensation electrode structure 44 is designed as a plurality strips or a comb shape.

The common electrodes 40b may use a non-transparent material, such as Al and MoW, and may be patterned on same plane with the common line 40a, the data line 34 or the gate line 32. The pixel electrode 42b and the compensation electrode 44a may use a transparent material, such as ITO or IZO, and patterned on an insulating layer 41 that is deposited on the common electrodes 40b. Also, since the compensation electrodes 44a and the pixel electrodes 42b are patterned on the same plane by the same step of photolithography process, the interval between two adjacent compensation electrode 44a and pixel electrode 42b is easily fixed at a constant distance D. Therefore, no matter the distance S1 (between the common electrode $40b_1$ and the pixel electrode $42b_1$), the distance S2 (between the pixel electrode $42b_1$ and the common electrode $40b_2$), the distance S3 (between the common electrode $40b_2$ and the pixel electrode $42b_2$, and the distance S4 (between the pixel electrode $42b_2$ and the common electrode $40b_3$) are the same or not, each D spacing region (between the compensation electrode 44a and the pixel electrode 42) has the same degree of in-plane electric field, resulting in the same capacitance and transmittance. This eliminates trip mura, shot mura and flicker found in the conventional IPS-LCD.

Figure 6:
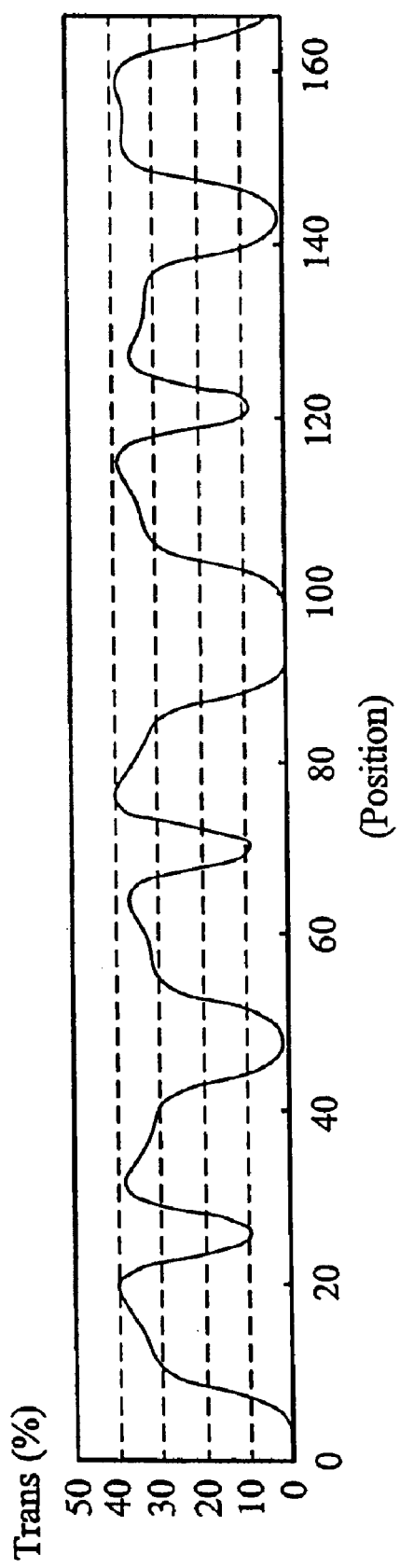
FIG. 6 is a transmittance-position diagram according to one preferred case according to the first embodiment of the present invention.
Figure 7A:
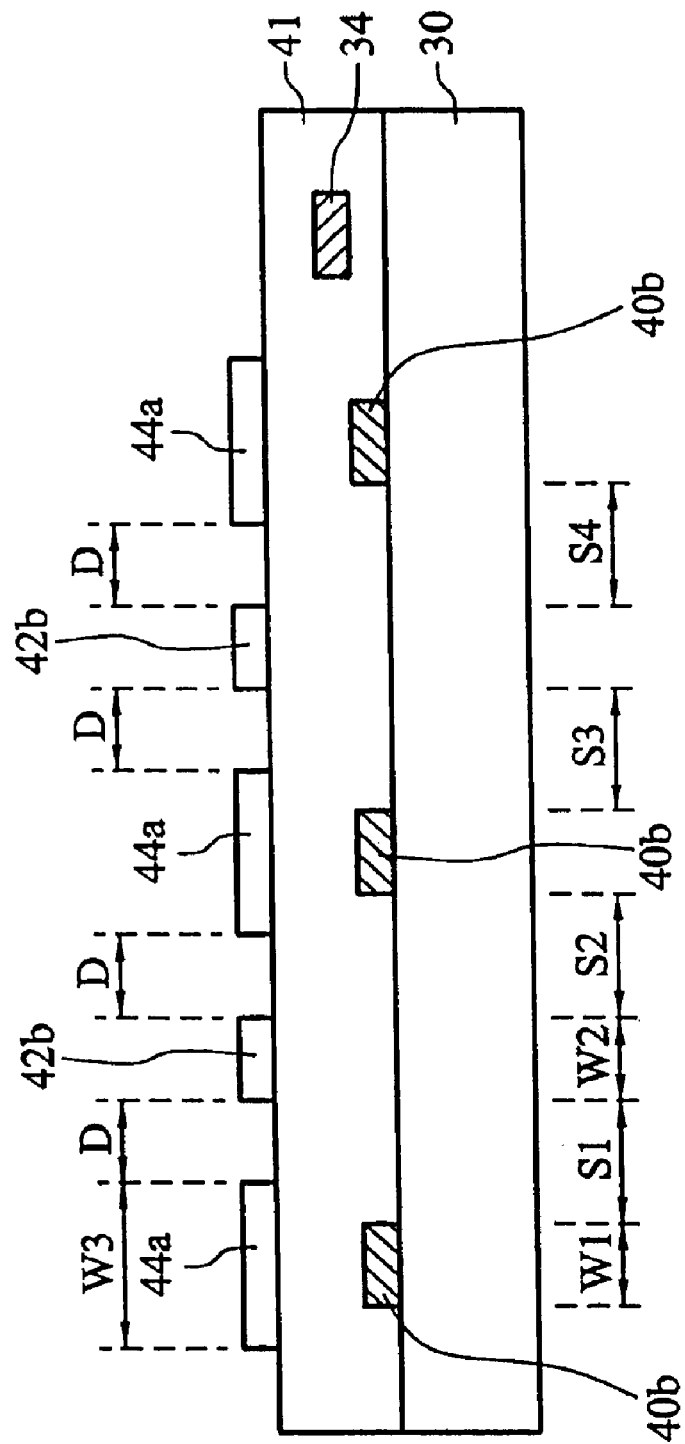
FIGS. 7A to 7C are sectional diagrams showing three preferred cases of the overlapping relation between the common electrode and the compensation electrode.
Figure 7B:
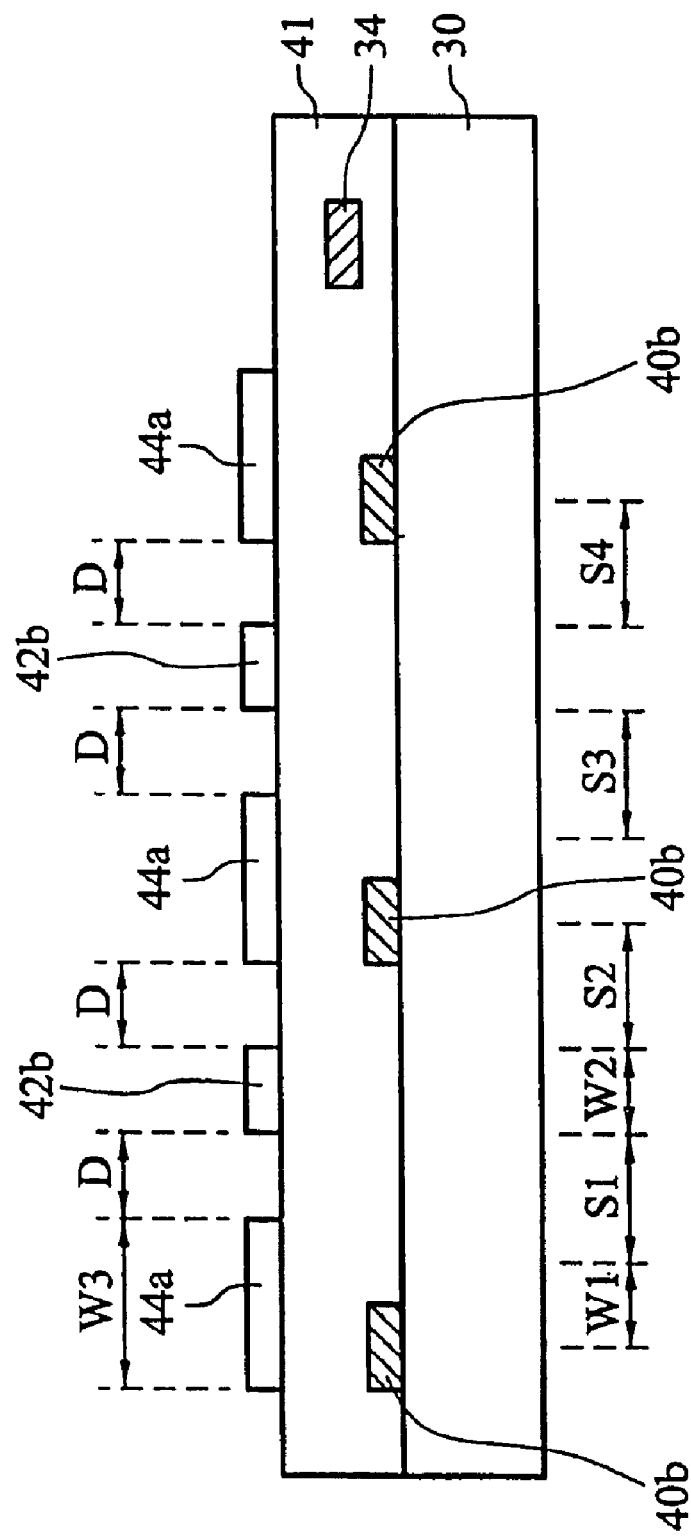
Figure 7C:
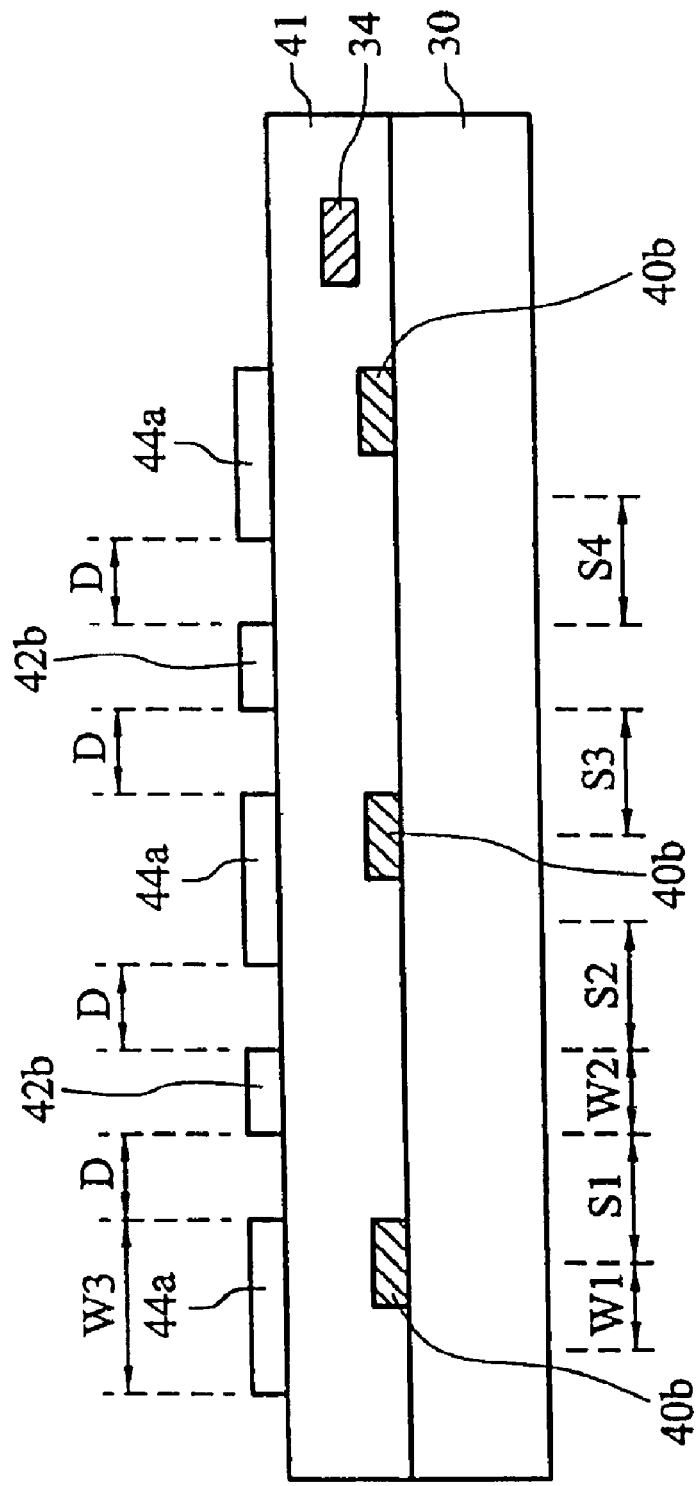

The width W1, W2, W3 of the common electrode 40b, the pixel electrode 42b and the compensation electrode 44a are not limited. Preferably, W1=2~3 μm, W2=4~5 μm, W3=4~5 μm, and D=9~15 μm. In one preferred case, W1=3 μm, W2=4 μm, W3=4 μm and D=9 μm provide a good result as shown in FIG. 6, in which each D spacing region has the same transmittance. The overlapping relation between the compensation electrode 44a and the common electrode 40b is not limited. In one preferred case, the middle of the common electrode 40b is aligned to the middle of the compensation electrode 44a, as shown in FIG. 7A. In another preferred case, the left sidewall of the common electrode 40b is aligned to the left sidewall of the compensation electrode 44a, as shown in FIG. 7B. In the other preferred case, the right sidewall of the common electrode 40b is aligned to the right sidewall of the compensation electrode 44a, as shown in FIG. 7C.

Second Embodiment

Figure 8A:
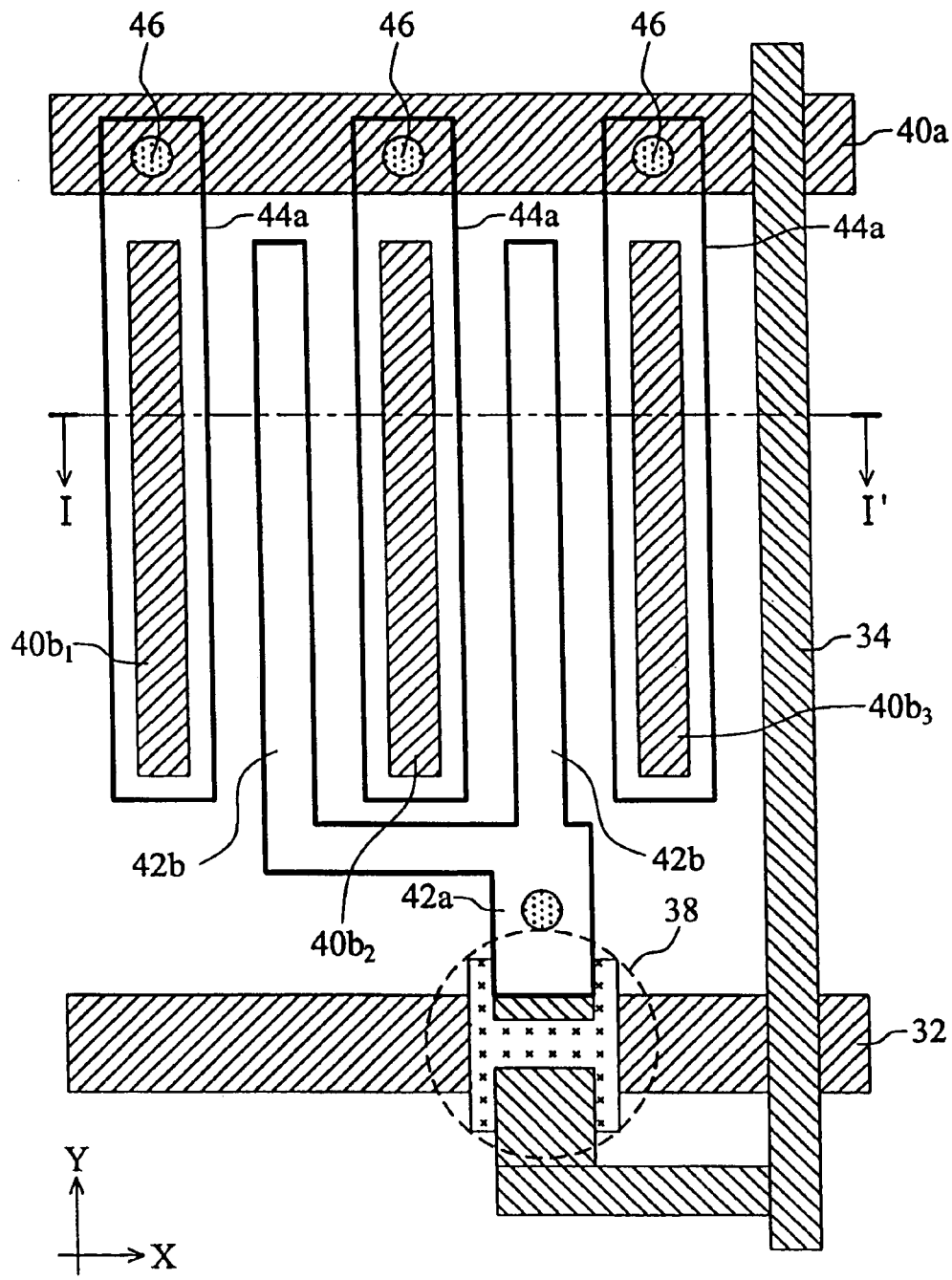
FIG. 8A is a top view showing an electrode array within a pixel area of an IPS-LCD according to the second embodiment of the present invention.
Figure 8B:
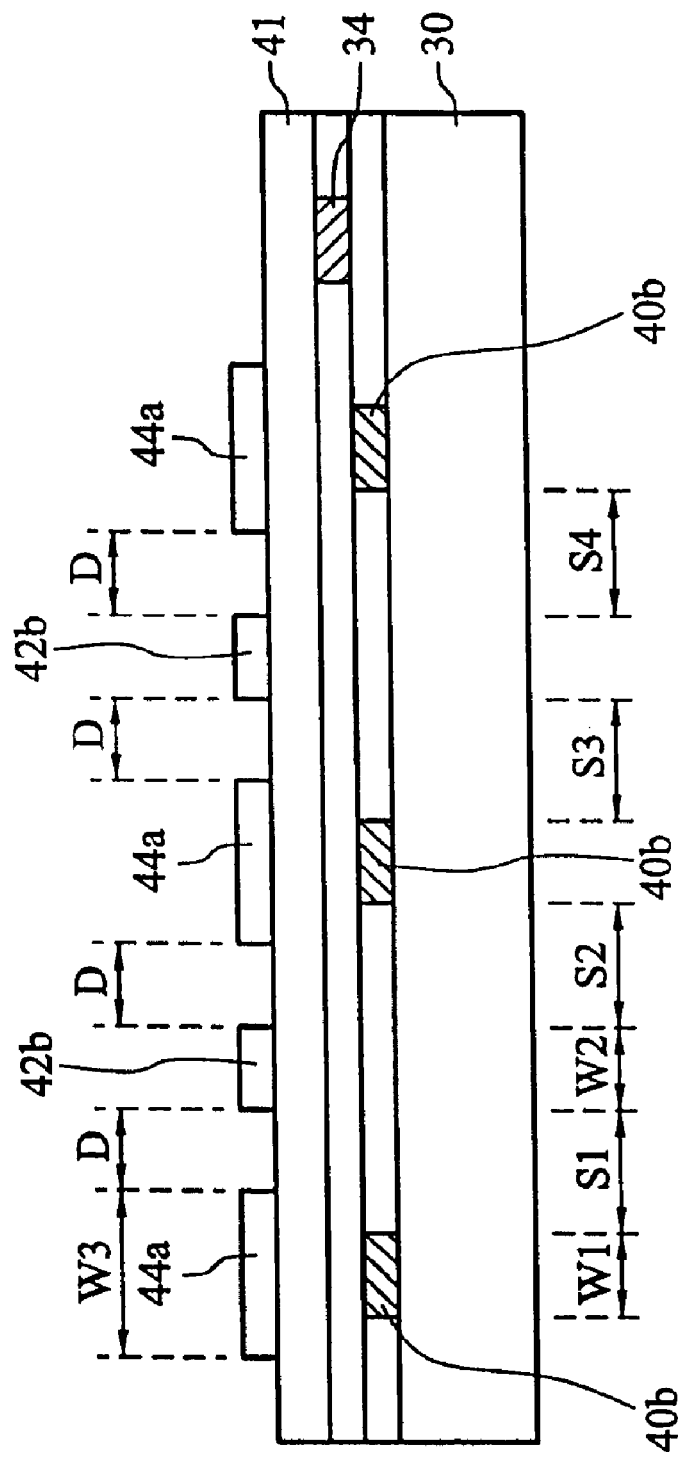
FIG. 8B is a sectional diagram along line I–I' shown in FIG. 8A.

FIG. 8A is a top view showing an electrode array within a pixel area of an IPS-LCD according to the second embodiment of the present invention. FIG. 8B is a sectional diagram along line I–I' shown in FIG. 8A.

On the glass substrate 30, the electrode array within the pixel area 36 is almost the same as that described in the first embodiment. The only one difference is that the common electrodes 40b are not connected to the common line 40a, and thus the common electrode 40b becomes a floating layer under the compensation electrode 44a. The common electrodes 40b may use a non-transparent material, such as Al and MoW, and may be patterned on same plane with the common line 40a, the data line 34 or the gate line 32. It is noticed that the compensation electrode 44a is still electrically connected to the common line 40a via the through hole 46.

As shown in FIG. 8B, the interval between two adjacent compensation electrode 44a and pixel electrode 42b is easily fixed at a constant distance D. Therefore, no matter the distance S1, the distance S2, the distance S3, and the distance S4 are the same or not, each D spacing region has the same degree of in-plane electric field, resulting in the same capacitance and transmittance. This eliminates trip mura, shot mura and flicker found in the conventional IPS-LCD.

Third Embodiment

Figure 9A:
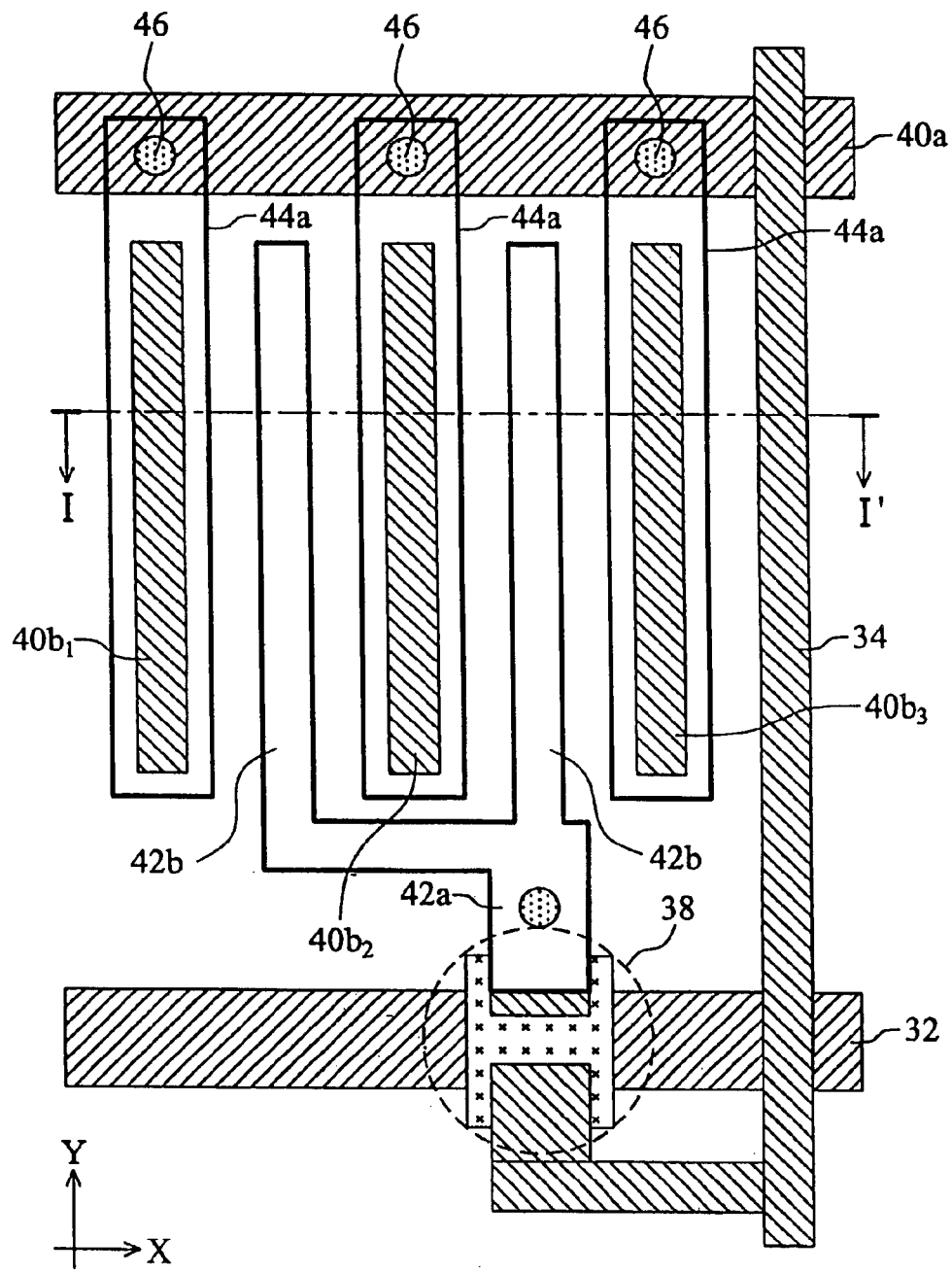
FIG. 9A is a top view showing an electrode array within a pixel area of an IPS-LCD according to the third embodiment of the present invention.
Figure 9B:
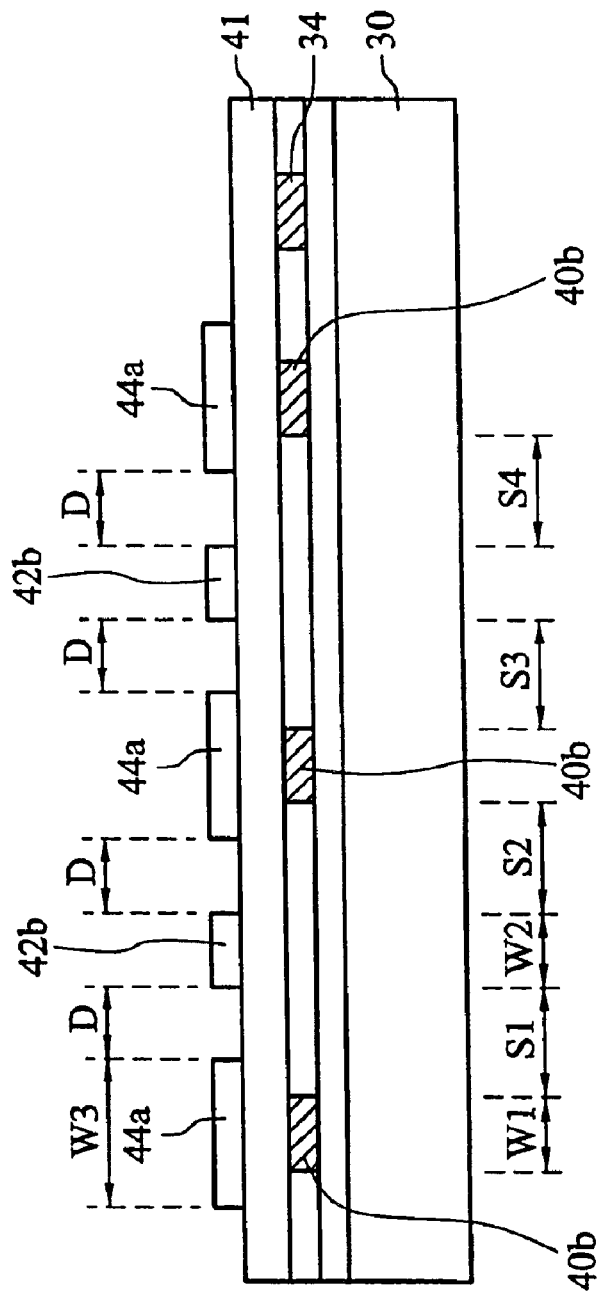
FIG. 9B is a sectional diagram along line I–I' shown in FIG. 9A.

FIG. 9A is a top view showing an electrode array within a pixel area of an IPS-LCD according to the third embodiment of the present invention. FIG. 9B is a sectional diagram along line I–I' shown in FIG. 9A.

On the glass substrate 30, the electrode array within the pixel area 36 is almost the same as that described in the second embodiment. The only one difference is that the common electrodes 40b uses a non-transparent material, such as Al and MoW, and is patterned on same plane with the data line 34.

As shown in FIG. 9B, the interval between two adjacent compensation electrode 44a and pixel electrode 42b is easily fixed at a constant distance D. Therefore, no matter the distance S1, the distance S2, the distance S3, and the distance S4 are the same or not, each D spacing region has the same degree of in-plane electric field, resulting in the same capacitance and transmittance. This eliminates trip mura, shot mura and flicker found in the conventional IPS-LCD.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An IPS-LCD with a compensation electrode structure, comprising:
    a substrate;
    a common electrode over a portion of the substrate;
    an insulating layer covering the common electrode and the substrate;
    a compensation electrode over a first portion of the insulating layer; and
    a pixel electrode over a second portion of the insulating layer;
    wherein the compensation electrode overlaps the common electrode.

2. The IPS-LCD with a compensation electrode structure as claimed in claim 1, wherein the compensation electrode is electrically connected to the common electrode via a through hole in the insulating layer.

3. The IPS-LCD with a compensation electrode structure as claimed in claim 1, wherein the pixel electrode and the compensation electrode are made of a transparent conductive material.

4. The IPS-LCD with a compensation electrode structure as claimed in claim 3, wherein the transparent conductive material is ITO or IZO.

5. The IPS-LCD with a compensation electrode structure as claimed in claim 1, wherein the common electrode is made of a non-transparent conductive material.

6. The IPS-LCD with a compensation electrode structure as claimed in claim 5, wherein the non-transparent conductive material is Al or MoW.

7. The IPS-LCD with a compensation electrode structure as claimed in claim 1, wherein the compensation electrode and the pixel electrode are coplanar.

8. The IPS-LCD with a compensation electrode structure as claimed in claim 1, wherein a width W1 of the common electrode and a width W3 of the compensation electrode satisfy the formula: W3−W1≧1 μm.

9. A method of forming an IPS-LCD with a compensation electrode structure, comprising the steps of:
- providing a substrate;
- forming a common electrode over a portion of the substrate;
- forming an insulating layer to cover the common electrode and the substrate;
- forming a compensation electrode over a first portion of the insulating layer; and
- forming a pixel electrode over a second portion of the insulating layer;
- wherein the compensation electrode overlaps the common electrode.

10. The method as claimed in claim 9, further comprising forming a through hole in the insulating layer to electrically connect the compensation electrode and the common electrode.

11. The method as claimed in claim 9, wherein the pixel electrode and the compensation electrode are made of a transparent conductive material.

12. The method as claimed in claim 11, wherein the transparent conductive material is ITO or IZO.

13. The method as claimed in claim 9, wherein the common electrode is made of a non-transparent conductive material.

14. The method as claimed in claim 13, wherein the non-transparent conductive material is Al or MoW.

15. The method as claimed in claim 9, wherein the compensation electrode and the pixel electrode are coplanar.

16. The method as claimed in claim 9, wherein a width W1 of the common electrode and a width W3 of the compensation electrode satisfy the formula: W3−W1≧1 μm.

* * * * *